(12) United States Patent
Ji

(10) Patent No.: US 9,485,659 B2
(45) Date of Patent: Nov. 1, 2016

(54) METHOD AND APPARATUS FOR MONITORING NETWORK DEVICE

(71) Applicant: Huawei Technologies Co., Ltd., Shenzhen (CN)

(72) Inventor: Ping Ji, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 14/538,360

(22) Filed: Nov. 11, 2014

(65) Prior Publication Data

US 2015/0208242 A1 Jul. 23, 2015

Related U.S. Application Data

(63) Continuation of application No. PCT/CN2014/081729, filed on Jul. 7, 2014.

(30) Foreign Application Priority Data

Jan. 20, 2014 (CN) .......................... 2014 1 0026422

(51) Int. Cl.
*H04L 29/06* (2006.01)
*H04W 12/08* (2009.01)
*H04W 12/12* (2009.01)

(52) U.S. Cl.
CPC ............. *H04W 12/08* (2013.01); *H04W 12/12* (2013.01); *H04L 63/02* (2013.01); *H04L 63/10* (2013.01); *H04L 63/101* (2013.01); *H04L 63/1425* (2013.01)

(58) Field of Classification Search
CPC . H04W 64/003; H04W 24/04; H04W 88/08; H04W 12/12; H04W 4/02; H04L 63/1441; H04L 63/1466; H04L 63/10
See application file for complete search history.

(56) References Cited

U.S. PATENT DOCUMENTS

| | | | |
|---|---|---|---|
| 6,957,067 B1 | 10/2005 | Iyer et al. | |
| 7,370,362 B2 * | 5/2008 | Olson | H04L 63/1433 726/25 |
| 7,826,426 B1 * | 11/2010 | Bharghavan | H04W 36/18 370/328 |
| 2007/0183375 A1 | 8/2007 | Tiwari | |
| 2011/0161027 A1 * | 6/2011 | Ericson | H04M 3/306 702/65 |

(Continued)

FOREIGN PATENT DOCUMENTS

| CN | 102014378 A | 4/2011 |
|---|---|---|
| CN | 102684897 A | 9/2012 |

(Continued)

*Primary Examiner* — Oleg Korsak
(74) *Attorney, Agent, or Firm* — Slater Matsil, LLP

(57) ABSTRACT

Embodiments of the present invention disclose a method and an apparatus for monitoring a network device, and relate to the field of information network technologies. The method in the present invention includes acquiring basic service set identifiers (BSSIDs) of wireless network devices in a network system managed by a network management system and determining BSSIDs of unauthorized wireless network devices in the acquired BSSIDs of the wireless network devices in the network system by using a fingerprint database of authorized wireless network devices. The method also includes acquiring a media access control (MAC) forwarding table corresponding to a network port used by a user and determining an unauthorized wireless network device connected to the network port according to the BSSIDs of the unauthorized wireless network devices and a MAC address.

10 Claims, 11 Drawing Sheets

(56) References Cited

U.S. PATENT DOCUMENTS

2011/0191827 A1\* 8/2011 Balay ................... G06F 17/30
  726/4
2013/0173794 A1 7/2013 Agerbak

FOREIGN PATENT DOCUMENTS

| CN | 102843682 A | 12/2012 |
| CN | 103780430 A | 5/2014 |

\* cited by examiner

METHOD AND APPARATUS FOR MONITORING NETWORK DEVICE

This application is a continuation of International Application No. PCT/CN 2014/081729, filed on Jul. 7, 2014, which claims priority to Chinese Patent Application No. 201410026422.6, filed on Jan. 20, 2014, both of which are hereby incorporated by reference in their entireties.

TECHNICAL FIELD

The present invention relates to the field of information network technologies, and in particular, to a method and an apparatus for monitoring a network device.

BACKGROUND

An enterprise generally uses an internal network to prevent leakage of enterprise information. However, when an internal user of the enterprise privately connects a wireless network device to the internal network, leakage of a wireless signal of the internal network is caused, and consequently, an outsider can attack the internal network by using the wireless network with leakage; or an internal user downloads internal data by connecting a mobile terminal to the wireless network device, which results in information leakage. Therefore, for the internal network of the enterprise, the wireless network device that is privately connected to the internal network by the internal user is an unauthorized wireless network device, and the connection of the unauthorized wireless network device brings about a great potential security risk to the internal network of the enterprise.

To eliminate a potential security risk brought about by an unauthorized wireless network device to an internal network of an enterprise, a network management system in the prior art establishes a fingerprint database of authorized wireless network devices according to MAC (Media Access Control) addresses of all authorized wireless network devices within the internal network, where the fingerprint database of the authorized wireless network devices includes the MAC addresses of all the authorized wireless network devices within the internal network. After that, the network management system acquires a MAC forwarding table corresponding to a network port, and a MAC forwarding table corresponding to a network port includes a MAC address of a device connected to the network port. Only one device is generally connected to a downlink network port used by a user of an internal network, for example, only one computer allocated by the company is connected to a network port of one employee. Therefore, a network management system considers by default that a situation in which only one device is connected to a network port is a normal situation. In the prior art, only when the network management system detects that two or more than two MAC addresses exist in the MAC forwarding table corresponding to the network port, the network management system detects whether the MAC addresses in the MAC forwarding table exist in the fingerprint database of the authorized wireless network devices, and if a MAC address in the MAC forwarding table does not exist in the fingerprint database of the authorized wireless network devices, the network management system considers that an unauthorized wireless device is connected to the internal network. However, when the MAC forwarding table corresponding to the network port has only one MAC address, that is, only one device is connected to the network port, the network management system determines that a situation in which only one device is connected to the network port is a normal situation, and considers by default that it is an authorized wireless network device that connects to the network port.

Therefore, when an internal user replace an authorized wireless network device that is originally connected to a network port with an unauthorized wireless network device, the network management system detects that only one MAC address exists in a MAC forwarding table corresponding to the network port, and still considers by default that it is an authorized wireless network device that connects to the network port. In this case, not all unauthorized wireless network devices connected to the internal network can be found, which reduces accuracy of finding an unauthorized wireless network device connected to the internal network, and also reduces security of internal network information.

SUMMARY

Embodiments of the present invention provide a method and an apparatus for monitoring a network device, which can determine an unauthorized wireless network device connected to a network port in a case in which only one device is connected to the network port, thereby improving security of internal network information.

To achieve the foregoing objective, the present invention uses the following technical solutions.

According to a first aspect, an embodiment of the present invention provides a method for monitoring a network device, and applied to a network management system. The method includes acquiring basic service set identifier BSSIDs of wireless network devices in a network system managed by the network management system, determining BSSIDs of the unauthorized wireless network devices in the acquired BSSIDs of the wireless network devices in the network system by using a fingerprint database of authorized wireless network devices. The fingerprint database of the authorized wireless network devices includes BSSIDs of all the authorized wireless network devices. The fingerprint database of the authorized wireless network devices does not include any BSSIDs of the unauthorized wireless network devices. The method further includes acquiring a media access control MAC forwarding table corresponding to a network port used by a user. The MAC forwarding table includes a MAC address of a wireless network device connected to the network port. The method further includes determining, according to the BSSIDs of the unauthorized wireless network devices and the MAC address, an unauthorized wireless network device connected to the network port.

With reference to the first aspect, in a first possible implementation manner, the determining, according to the BSSIDs of the unauthorized wireless network devices and the MAC address, an unauthorized wireless network device connected to the network port includes detecting whether the MAC address is the same as the BSSIDs of the unauthorized wireless network devices. If yes, determining, according to the MAC address, the unauthorized wireless network device connected to the network port.

With reference to the first aspect, in a second possible implementation manner, the determining, according to the BSSIDs of the unauthorized wireless network devices and the MAC address, an unauthorized wireless network device connected to the network port includes processing the BSSIDs of the unauthorized wireless network devices and the MAC address according to a longest match principle and by using a bit mask, and obtaining processing results corresponding to the BSSIDs of the unauthorized wireless network devices and a processing result corresponding to the MAC address. The method further includes detecting whether the processing results corresponding to the BSSIDs of the unauthorized wireless network devices are the same as the processing result corresponding to the MAC address. If yes, determining, according to the MAC address, the unauthorized wireless network device connected to the network port.

With reference to the first aspect, in a third possible implementation manner, the determining, according to the BSSIDs of the unauthorized wireless network devices and the MAC address, an unauthorized wireless network device connected to the network port includes calculating a similarity between the BSSID of the unauthorized wireless network device and the MAC address by using a similarity matching algorithm, and detecting whether the similarity is greater than or equal to a preset threshold. The method further includes determining, according to the MAC address, the unauthorized wireless network device connected to the network port if the similarity is greater than or equal to the preset threshold.

With reference to any possible implementation manner of the first to the third possible implementation manners of the first aspect, in a fourth possible implementation manner, after the determining the unauthorized wireless network device, the method includes disabling the network port to which the unauthorized wireless network device is connected.

With reference to the first aspect or any possible implementation manner of the first to the fourth possible implementation manners of the first aspect, in a fifth possible implementation manner, after the determining the BSSIDs of the unauthorized wireless network devices, the method further includes acquiring a mask and performing an AND operation processing on the BSSIDs of the unauthorized wireless network device and the mask to obtain processing results. The method further includes determining that the BSSIDs, corresponding to the processing results being partially the same, of the unauthorized wireless network device are BSSIDs belonging to one unauthorized wireless network device. The method further includes detecting whether the number of all the BSSIDs belonging to the unauthorized wireless network device is greater than or equal to 2; and if the number is greater than or equal to 2, maintaining one BSSID of the unauthorized wireless network device.

According to a second aspect, an embodiment of the present invention provides an apparatus for monitoring a network device, where the apparatus is applied to a network management system, and the apparatus includes a first acquiring module, configured to acquire basic service set identifier BSSIDs of wireless network devices in a network system managed by the network management system. A second acquiring module is configured to determine BSSIDs of the unauthorized wireless network devices in the acquired BSSIDs of the wireless network devices in the network system by using a fingerprint database of authorized wireless network devices. The fingerprint database of the authorized wireless network devices includes BSSIDs of all the authorized wireless network devices, and the fingerprint database of the authorized wireless network devices does not include any BSSIDs of the unauthorized wireless network devices. A third acquiring module is configured to acquire a media access control MAC forwarding table corresponding to a network port used by a user. The MAC forwarding table includes a MAC address of a wireless network device connected to the network port. A first determining module is configured to determine, according to the BSSIDs of the unauthorized wireless network devices and the MAC address, an unauthorized wireless network device connected to the network port.

With reference to the second aspect, in a first possible implementation manner, the first determining module is further configured to detect whether the MAC address is the same as the BSSIDs of the unauthorized wireless network devices. If yes, the first determining module is further configured to, determine, according to the MAC address, the unauthorized wireless network device connected to the network port.

With reference to the second aspect, in a second possible implementation manner, the first determining module is further configured to process the BSSIDs of the unauthorized wireless network devices and the MAC address according to a longest match principle and by using a bit mask, and obtain processing results corresponding to the BSSIDs of the unauthorized wireless network devices and a processing result corresponding to the MAC address. The first determining module is further configured to detect whether the processing results corresponding to the BSSIDs of the unauthorized wireless network devices are the same as the processing result corresponding to the MAC address. If yes, the first determining module is further configured to determine, according to the MAC address, the unauthorized wireless network device connected to the network port.

With reference to the second aspect, in a third possible implementation manner, the first determining module is further configured to calculate a similarity between the BSSID of the unauthorized wireless network device and the MAC address by using a similarity matching algorithm. The first determining module is further configured to detect whether the similarity is greater than or equal to a preset threshold, and configured to determine, according to the MAC address, the unauthorized wireless network device connected to the network port when the similarity is greater than or equal to the preset threshold.

With reference to any possible implementation manner of the first to the third possible implementation manners of the second aspect, in a fourth possible implementation manner, the apparatus includes a disabling module, configured to disable the network port to which the unauthorized wireless network device is connected.

With reference to the second aspect or any possible implementation manner of the first to the fourth possible implementation manners of the second aspect, in a fifth possible implementation manner, the apparatus further includes a processing module, configured to acquire a mask and perform an AND operation processing on the BSSIDs of the unauthorized wireless network device and the mask to obtain processing results. A second determining module is configured to determine that the BSSIDs, corresponding to the processing results being partially the same, of the unauthorized wireless network device are BSSIDs belonging to one unauthorized wireless network device. A detecting module is configured to detect whether the number of all the BSSIDs belonging to the unauthorized wireless network device is greater than or equal to 2; and when the number is greater than or equal to 2, maintain one BSSID of the unauthorized wireless network device.

According to a method and an apparatus for monitoring a network device provided in the embodiments of the present invention, BSSIDs (Basic Service Set Identifier) of wireless network devices in a network system managed by a network management system can be acquired; BSSIDs of unauthorized wireless network devices are determined in the acquired BSSIDs of the wireless network devices in the network system by using a fingerprint database of authorized wireless network devices; a media access control MAC forwarding table corresponding to a network port used by a user is acquired; and the unauthorized wireless network device connected to the network port is determined in the MAC forwarding table corresponding to the network port according to the BSSIDs of the unauthorized wireless network devices. Compared with the prior art, the solution determines, without depending on a specific number of MAC addresses in the MAC forwarding table, whether there is an unauthorized wireless network device connected to a network. Instead, the network port to which the unauthorized wireless network device is connected and the unauthorized wireless network device are accurately determined according to the BSSIDs of the unauthorized wireless network devices and the MAC forwarding table corresponding to the network port. Even in a case in which only one device is connected to the network port, an unauthorized wireless network device connected to the network port can also be determined, thereby improving security of internal network information.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Technical solutions provided in the embodiments of the present invention are applied to monitoring a network device, and can detect an unauthorized wireless network device existing in a network. In a practical application, a network is generally connected to various wireless network devices, such as a wireless router, a mobile phone, a tablet computer. A wireless network device that is authenticated and registered on the network is an authorized wireless network device, while a wireless network device that is connected to the network by a user privately and is not authenticated or registered is an unauthorized wireless network device. In the embodiments of the present invention, a network management system acquires BSSIDs (Basic Service Set Identifier) of wireless network devices in a network system; obtains BSSIDs of unauthorized wireless network devices in the BSSIDs of the network devices in the network system by using a fingerprint database of authorized wireless network devices; acquires a MAC forwarding table corresponding to a network port; and determines, according to the BSSIDs of the unauthorized wireless network devices and in the MAC forwarding table corresponding to the network port, an unauthorized wireless network device connected to the network port.

Figure 1A:
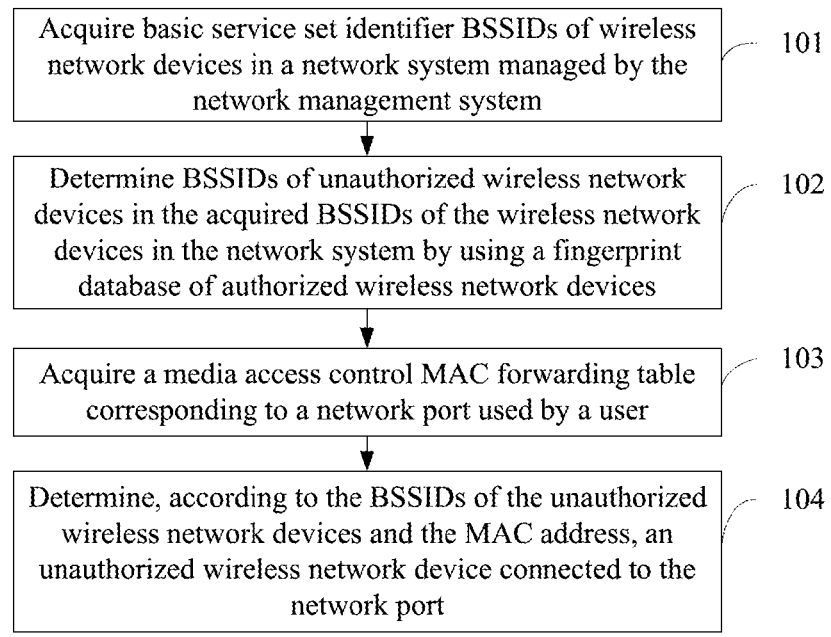
FIG. 1a is a flowchart of a method for monitoring a network device according to an embodiment of the present invention.

An embodiment of the present invention provides a method for monitoring a network device. As shown in FIG. 1a, the method includes the following steps.

101: Acquire basic service set identifier BSSIDs of wireless network devices in a network system managed by the network management system.

Figure 1B:
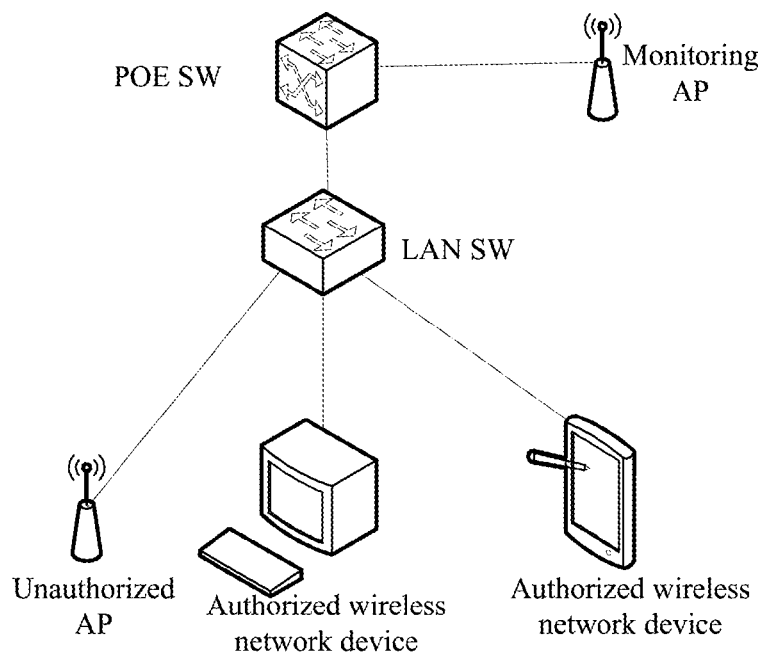
FIG. 1b and FIG. 1c are schematic diagrams of an exemplary BSSID for detecting a wireless network device according to an embodiment of the present invention.
Figure 1C:
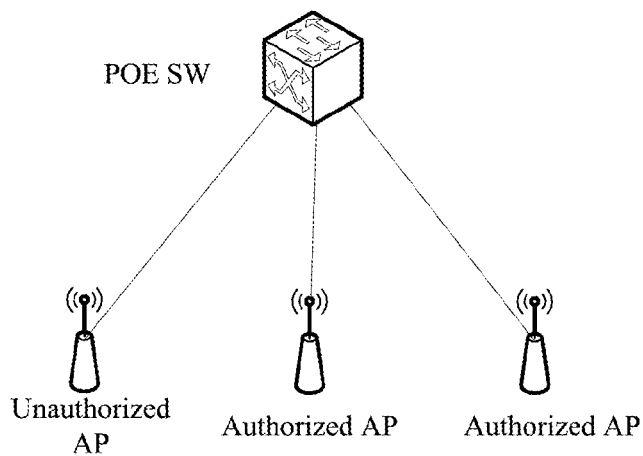

The network management system may use air interface detection to acquire a BSSID of a network device in the network system. For example, as shown in FIG. 1b, a wired network sets a monitoring AP (Access Point, wireless access point) to listen to a wireless network device on the network, parse a radio frame of the wireless network device, and detect the BSSID of the wireless network device. For another example, as shown in FIG. 1c, an existing authorized AP on the network switches a channel to detect the wireless network device on the network. The BSSID of the detected wireless network device may be reported to a controller by a fit AP (FIT AP), or may be directly stored locally by a fat AP (FAT AP). That the network management system acquires the BSSID of the wireless network device may be that: The BSSID of the wireless network device may be acquired from the controller or the FAT AP regularly; or when the wireless network device is detected, the network management system is triggered to acquire the BSSID of the wireless network device from the controller or the FAT AP; or the controller or the FAT AP may report the BSSID of the wireless network device to the network management system by using a packet such as a UDP (User Datagram Protocol) packet. The network management system acquires the BSSID of the wireless network device, and may generate a BSSID list of the wireless network device, which helps the network management system to search.

In a network with multiple sets of basic services, for example, there are two sets of basic services on the network, one set is for customer access, and the other set is for internal use. Therefore, an existing AP needs to be divided into multiple VAPs (Virtual Access Point). Although manufactures have different definitions of BSSIDs of the multiple VAPs into which a same AP is divided, the BSSIDs of the VAPs may be obtained. For example, a relationship between a VAP BSSID (Basic Service Set Identifier) of a manufacturer A and a wired port MAC is: VAP BSSID=wired port MAC+(RadioID*16+WlanID−1), so as to ensure that the lowest five bits of the wired port MAC address of the AP are 0. If the wired port MAC address is 00:04:03:02:01:00, BSSIDs of VAP0~15at a radio frequency 0 is 00:04:03:02:01:00-00:04:03:02:01:0F, and BSSIDs of VAP0~15 at a radio frequency 1 is 00:04:03:02:01:10-00:04:03:02:01:1F.

The network management system acquires a MAC forwarding table corresponding to a network port regularly, and a length of time between two consecutive regular acquisitions is consistent with an aging time of the MAC forwarding table. A user may specify a network port by using an open port used by a user to acquire a MAC forwarding table corresponding to the network port; or the network management system may acquire a MAC forwarding table corresponding to a selected network port by network port type identification. Further, a MAC address in the acquired MAC forwarding table is stored in a database. For example, as shown in Table 1, the database may include information such as a MAC address (MAC address), a VLAN (Virtual Local Area Network), a VSI (Virtual Switch Interface), a Learned-From (MAC address acquisition location) Type (address type).

TABLE 1

| MAC Address | VLAN/VSI | Learned-From | Type |
|---|---|---|---|
| 0022-0022-0033 | 100/— | GE1/0/0 | dynamic |
| 0000-0000-0001 | —/HW | GE1/0/1 | dynamic |

102: Determine BSSIDs of unauthorized wireless network devices in the acquired BSSIDs of the wireless network devices in the network system by using a fingerprint database of authorized wireless network devices.

An authorized wireless network device described in this embodiment of the present invention is a network device that is authenticated by the network management system, and the unauthorized wireless network device is not authenticated by the network management system. the fingerprint database of the authorized wireless network devices includes all BSSIDs of the authorized wireless network devices, and the fingerprint database of the authorized wireless network devices does not include the BSSIDs of the unauthorized wireless network devices. The fingerprint database of the authorized wireless network devices may be established in a manner in the prior art, which is not described in the embodiment of the present invention again.

Specifically, the network management system may acquire, by using a network management interface, a BSSID of an authorized wireless network device managed by an AC (Access Controller), where the network management interface may be the SNMP (Simple Network Management Protocol), the FTP (File Transfer Protocol), the Telnet, or the like; or an alarm be triggered, so that a BSSID of an authorized wireless network device is obtained from the controller; or the controller or a FAT AP may report a BSSID of an authorized wireless network device to the network management system by using a packet such as a UDP packet. After the BSSID of the authorized wireless network device is acquired, the fingerprint database of the authorized wireless network devices is established. In addition, the fingerprint database of the authorized wireless network devices may be established only once, and in a subsequent process, the BSSID of the authorized wireless network device in the fingerprint database of the authorized wireless network devices may be updated regularly.

Wireless network devices in the network system include an unauthorized wireless network device, and also include an authorized wireless network device that is mistakenly reported as an unauthorized wireless network device. For example, two APs on a network are authorized wireless network devices. When the two APs detect an unauthorized wireless network device, they may mistake each other for an unauthorized wireless network device, and consequently, in a subsequent process it is mistakenly determined that the two APs are unauthorized wireless network devices.

Therefore, the BSSID that is of the authorized wireless network device and exists in the fingerprint database of the authorized wireless network devices needs to be removed from the BSSIDs of the wireless network devices in the network system. The removing the BSSID that is of the authorized wireless network device and exists in the fingerprint database of the authorized wireless network devices from the BSSIDs of the wireless network devices in the network system may be: filtering, by the controller, received BSSIDs of the network devices to be detected; and may also be: performing filtering by the network management system.

103: Acquire a media access control MAC forwarding table corresponding to a network port used by a user.

The MAC forwarding table includes a MAC address of a wireless network device connected to the network port used by a user. The network port used by a user is a network port which may be used by a user to connect a network device, for example, a network port of an access switch, and the user may connect any network device by using the network port of the access switch.

104: Determine, according to the BSSIDs of the unauthorized wireless network devices and the MAC address, an unauthorized wireless network device connected to the network port.

Whether a device connected to the network port is an unauthorized wireless network device may be determined according to the MAC address in the MAC forwarding table and the BSSIDs of the unauthorized wireless network devices. Because the MAC address is used to define a location of the network device, a location of the unauthorized wireless network device connected to the network port can be determined according to the MAC address of the unauthorized wireless network device.

According to the method for monitoring a network device provided in this embodiment of the present invention, BSSIDs (Basic Service Set Identifier) of wireless network devices in a network system managed by a network management system can be acquired; BSSIDs of unauthorized wireless network devices are determined in the acquired BSSIDs of the wireless network devices in the network system by using a fingerprint database of authorized wireless network devices; a media access control MAC forwarding table corresponding to a network port used by a user is acquired; and the unauthorized wireless network device connected to the network port is determined according to the BSSIDs of the unauthorized wireless network devices and the MAC address. Compared with the prior art, the solution determines, without depending on a specific number of MAC addresses in the MAC forwarding table, whether there is an unauthorized wireless network device connected to a network. Instead, the unauthorized wireless network device connected to the network port is accurately determined according to the BSSIDs of the unauthorized wireless network devices and the MAC forwarding table corresponding to the network port. Even in a case in which only one device is connected to the network port, whether the device is an unauthorized wireless network device can also be determined, thereby improving security of internal network information; and in a case in which multiple devices are connected to the network port, whether the devices are unauthorized wireless network devices can also be accurately determined. In addition, the network management system regularly acquires the MAC forwarding table, so that when a network device is newly added to the network, a relationship between a network port and a MAC address can be directly acquired, and binding each network port and a corresponding MAC address is no longer required, which leads to greater flexibility in management of the network port and searching for the MAC address. In addition, to accurately obtain the BSSIDs of the unauthorized wireless network devices, a BSSID of an authorized wireless network device that may be mistakenly reported as an unauthorized wireless network device is filtered by using the fingerprint database of the authorized wireless network devices, thereby further improving a correctness percentage of determining the unauthorized wireless network device.

Figure 2A:
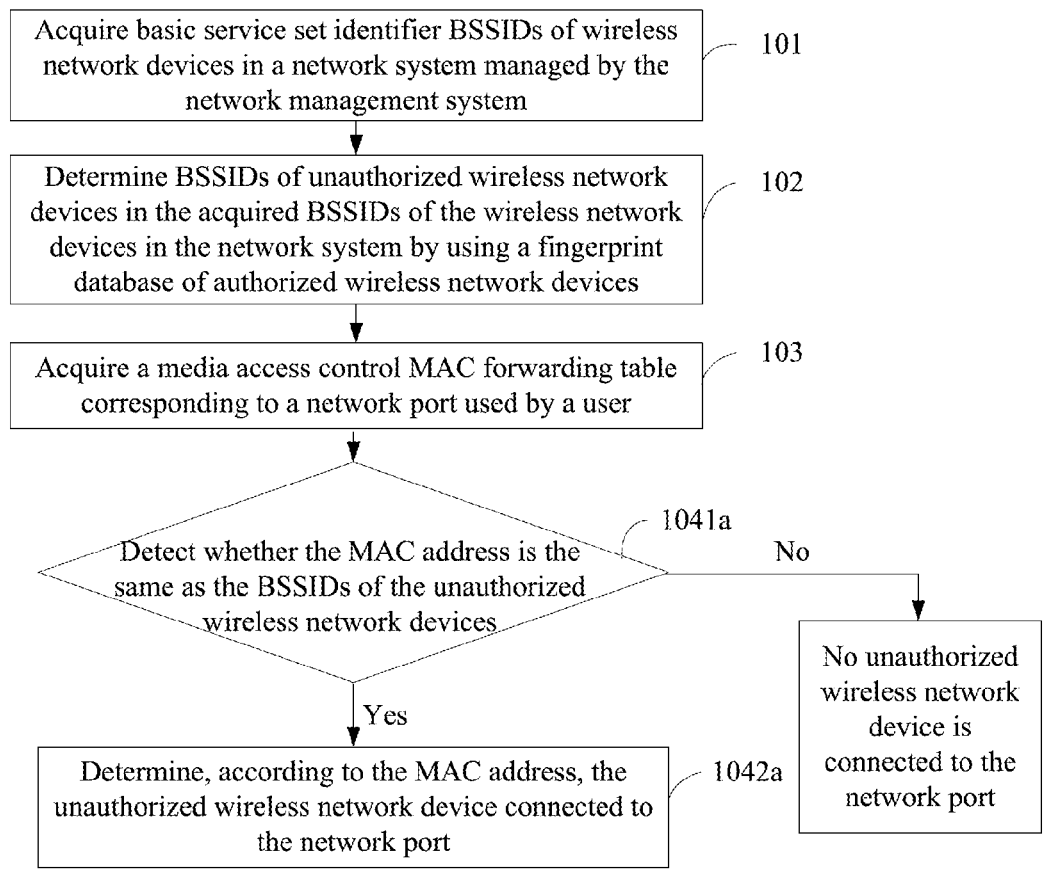
FIG. 2a, FIG. 2b and FIG. 2c are flowcharts of a specific implementation manner of a method for monitoring a network device according to an embodiment of the present invention.
Figure 2B:
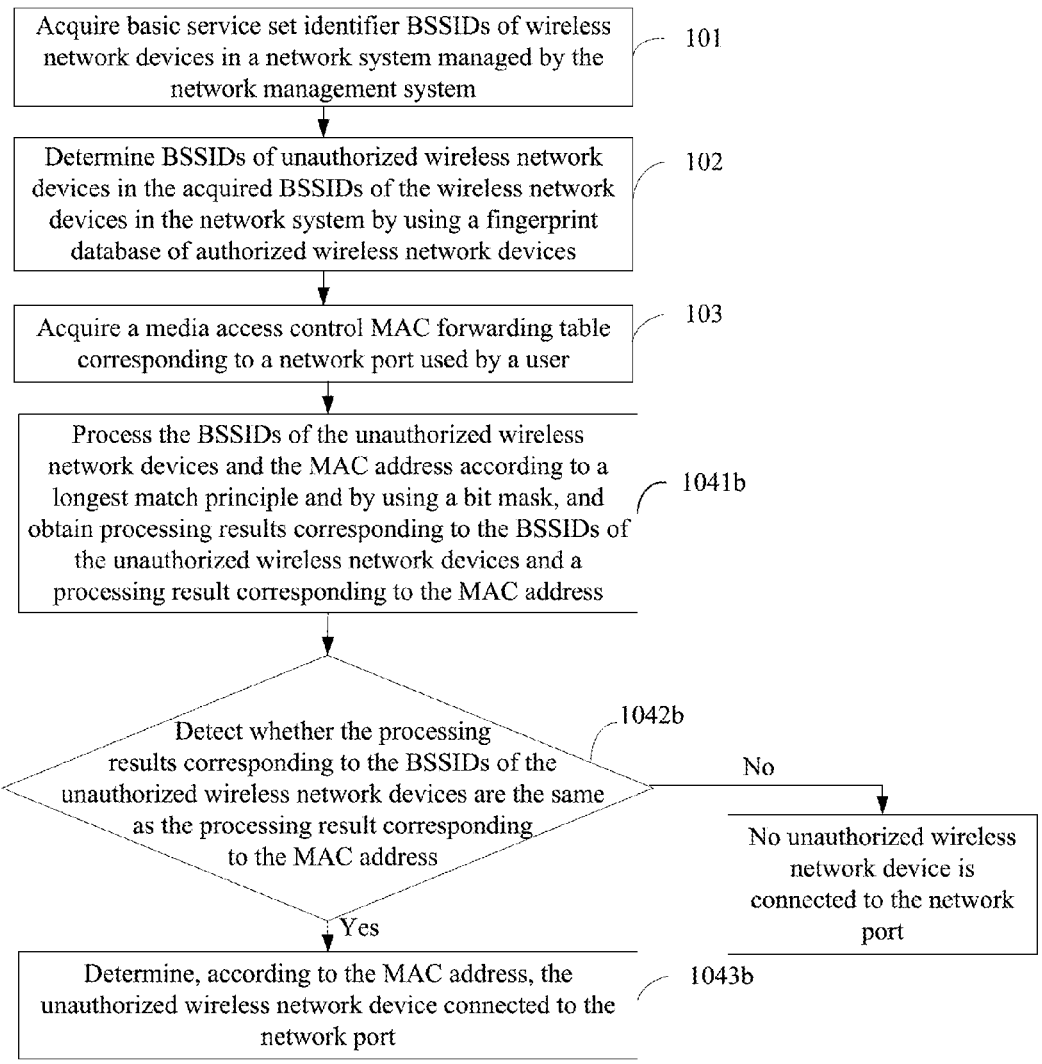
Figure 2C:
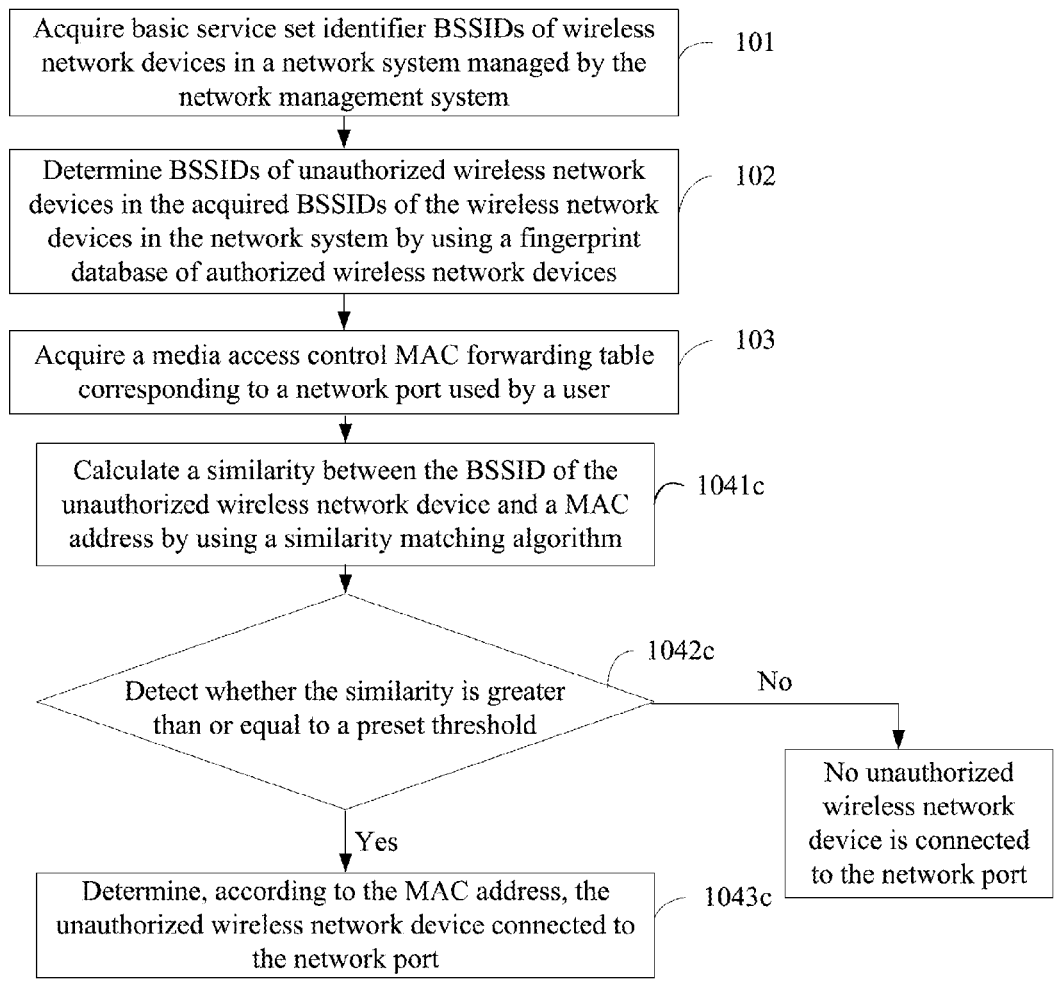

Further, based on the solution shown in FIG. 1(*a*), this embodiment of the present invention further provides a specific solution for the method for monitoring a network device, which further elaborates an execution process of step 104 in the solution shown in FIG. 1*a*. Step 104 may be specifically implemented as steps 1041*a* and 1042*a*, 1041*b*-1043*b* or 1041*c*-1043*c*. As shown in FIG. 2*a*, FIG. 2*b*, and FIG. 2*c*, step 104 includes the following steps.

1041*a*: Detect whether the MAC address is the same as the BSSIDs of the unauthorized wireless network devices.

The MAC forwarding table includes a MAC address of the device connected to the network port. Because types of unauthorized wireless network devices are different, specific manners of determining, according to the BSSIDs of the unauthorized wireless network devices and the MAC address, an unauthorized wireless network device connected to the network port are different. When the unauthorized wireless network device is a low-end FAT AP type device, it may be directly detected whether the MAC address in the MAC forwarding table corresponding to the network port is the same as the BSSIDs of the unauthorized wireless network devices. A BSSID of the low-end FAT AP type device is the same as a MAC address of the device, and the low-end FAT AP device may be a home wireless router, or the like.

1042*a*: If yes, determine, according to the MAC address, the unauthorized wireless network device connected to the network port.

Corresponding to the detection manner in 1041*a*, when the unauthorized wireless network device is a low-end FAT AP type device, if the MAC address in the MAC forwarding table corresponding to the network port is the same as the BSSIDs of the unauthorized wireless network devices, the unauthorized wireless network device connected to the network port used by a user may be determined according to the MAC address.

If the MAC address is different from the BSSIDs of the unauthorized wireless network devices, the device connected to the network port is an authorized wireless network device, and no unauthorized wireless network device is connected.

1041*b*: Process the BSSIDs of the unauthorized wireless network devices and the MAC address according to a longest match principle and by using a bit mask, and obtain processing results corresponding to the BSSIDs of the unauthorized wireless network devices and a processing result corresponding to the MAC address.

The MAC forwarding table includes a MAC address of the device connected to the network port. Because types of unauthorized wireless network devices are different, specific manners of determining, according to the BSSIDs of the unauthorized wireless network devices and the MAC address, the unauthorized wireless network device connected to the network port are different. When the unauthorized wireless network device is a high-end FAT AP type device or a FIT AP type device, the BSSID of the unauthorized wireless network device may be processed by using the bit mask and according to the longest match principle, to obtain the processing results corresponding to the BSSIDs of the unauthorized wireless network device, and the MAC address in the MAC forwarding table may be processed according to the longest match principle and by using the bit mask to obtain the processing result corresponding to the MAC address in the MAC forwarding table, where a minimum number of bits of the mask for a match is set according to an actual need of a user, and generally bits 0-8 are used.

1042*b*: Detect whether the processing results corresponding to the BSSIDs of the unauthorized wireless network devices are the same as the processing result corresponding to the MAC address.

1043*b*: If yes, determine, according to the MAC address, the unauthorized wireless network device connected to the network port.

Corresponding to the detection manner in 1042*b*, when the unauthorized wireless network device is a high-end FAT AP type device or a FIT AP type device, the BSSID of the unauthorized wireless network device and the MAC address in the MAC forwarding table are processed according to the longest match principle and by using the bit mask. If the processing result corresponding to the BSSID of the unauthorized wireless network device is the same as the processing result corresponding to the MAC address in the MAC forwarding table, the unauthorized wireless network device connected to the network port used by a user may be determined according to the MAC address.

If the processing result corresponding to the BSSID of the unauthorized wireless network device is different from the processing result corresponding to the MAC address, the device connected to the network port is an authorized wireless network device, and no unauthorized wireless network device is connected.

1041*c*: Calculate a similarity between the BSSID of the unauthorized wireless network device and the MAC address by using a similarity matching algorithm.

The MAC forwarding table includes a MAC address of the device connected to the network port. Because types of unauthorized wireless network devices are different, specific manners of determining, according to the BSSIDs of the unauthorized wireless network devices and the MAC address, the unauthorized wireless network device connected to the network port are different. When the unauthorized wireless network device is a high-end FAT AP type device or a FIT AP type device, a similarity between the BSSID of the unauthorized wireless network device and the MAC address in the MAC forwarding table corresponding to the network port may further be calculated. The similarity may be calculated by using a similarity matching algorithm, such as an edit distance algorithm, a longest common substring algorithm, a greedy string matching algorithm, or RKR-GST (Running Karp-Rabin Greedy String Tiling).

1042*c*: Detect whether the similarity is greater than or equal to a preset threshold.

The preset threshold may be set according to a historical empirical value, and may also be set by a user according to a specific situation.

1043c: Determine, according to the MAC address, the unauthorized wireless network device connected to the network port if the similarity is greater than or equal to the preset threshold.

Corresponding to the detection manner in 1042c, when the unauthorized wireless network device is a high-end FAT AP type device or a FIT AP type device, if the similarity between the BSSID of the unauthorized wireless network device and the MAC address in the MAC forwarding table corresponding to the network port is exceeds the preset threshold, the unauthorized wireless network device connected to the network port used by a user may be determined according to the MAC address.

According to the method for monitoring a network device provided in this embodiment of the present invention, BSSIDs of wireless network devices in a network system managed by a network management system can be acquired; BSSIDs of unauthorized wireless network devices are determined in the acquired BSSIDs of the wireless network devices in the network system by using a fingerprint database of authorized wireless network devices; a media access control MAC forwarding table corresponding to a network port used by a user is acquired; and the unauthorized wireless network device connected to the network port is determined by using different methods and according to different types of wireless network devices. Compared with the prior art, the solution determines, without depending on a specific number of MAC addresses in the MAC forwarding table, whether there is an unauthorized device connected to a network. Instead, the unauthorized wireless network device connected to the network port is accurately determined according to the BSSIDs of the unauthorized wireless network devices and the MAC forwarding table corresponding to the network port. Even in a case in which only one device is connected to the network port, whether the device is an unauthorized wireless network device can also be determined, thereby improving security of internal network information; and in a case in which multiple devices are connected to the network port, whether the devices are unauthorized wireless network devices can also be accurately determined. In addition, the network management system regularly acquires the MAC forwarding table, so that when a network device is newly added to the network, a relationship between a network port and a MAC address can be directly acquired, and binding each network port and a corresponding MAC address is no longer required, which leads to greater flexibility in management of the network port and searching for the MAC address. Further, because the BSSIDs of the network devices to be detected include a BSSID that is mistakenly reported as the BSSID of the unauthorized wireless network device, the BSSID of the unauthorized wireless network device is accurately obtained by using the fingerprint database of the authorized wireless network devices, thereby further improving a correctness percentage of determining the unauthorized wireless network device.

Figure 3A:
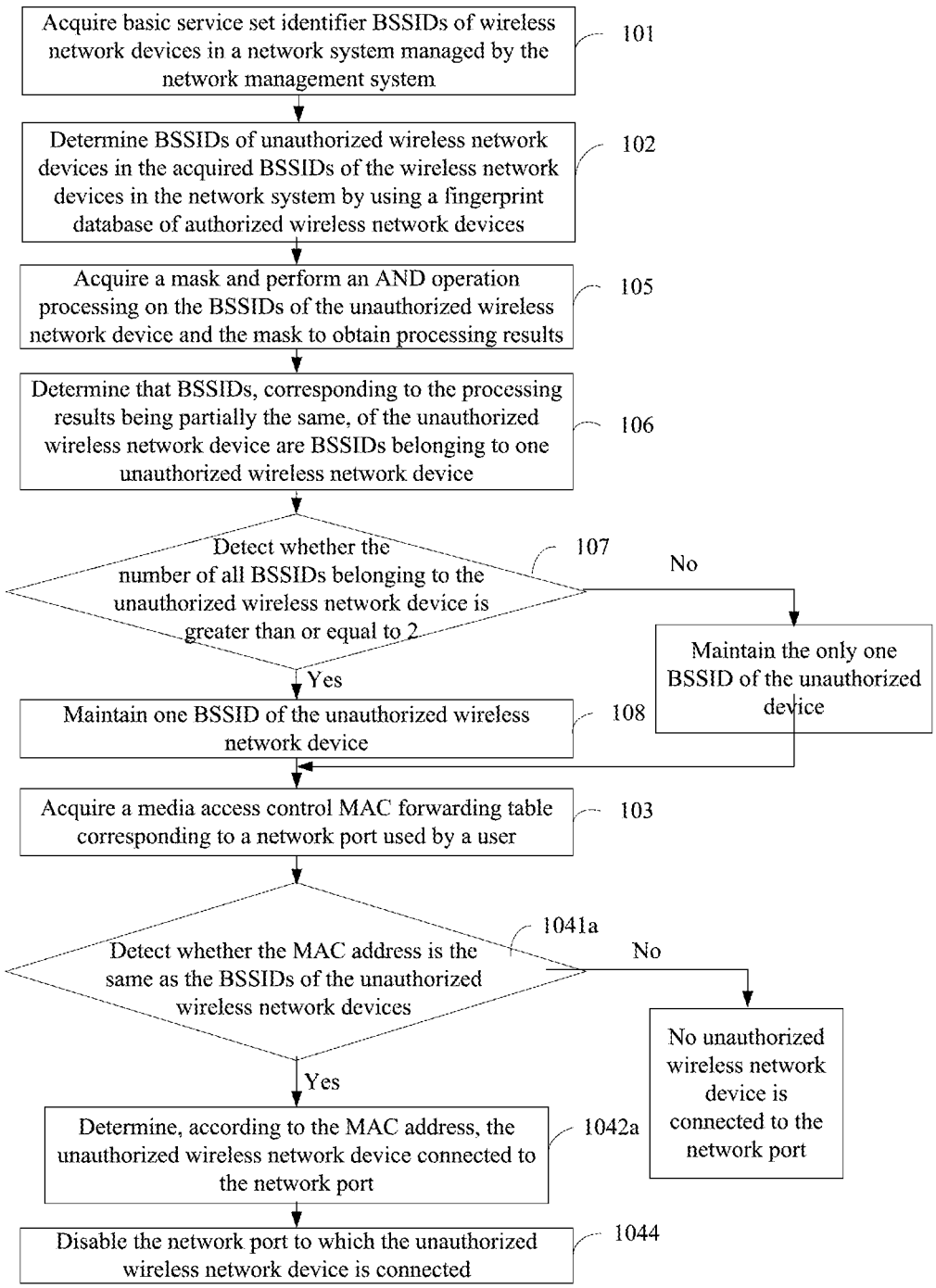
FIG. 3a, FIG. 3b(A), FIG. 3b(B) and FIG. 3c are flowcharts of another specific implementation manner of a method for monitoring a network device according to an embodiment of the present invention.

In addition, based on the solution shown in FIG. 2a, the embodiment of the present invention further provides a specific solution for the method for monitoring a network device, where 105-108 are added after 102, which reduces the number of BSSIDs belonging to a same unauthorized wireless network device, and also reduces the time for subsequently determining an unauthorized wireless network device; and 1044 may also be added after 1042a, to perform processing on a network port on which the determined unauthorized wireless network device is located. As shown in FIG. 3a, the solution includes the following.

105: Acquire a mask and perform an AND operation processing on the BSSIDs of the unauthorized wireless network device and the mask to obtain processing results.

The mask is used to detect whether multiple BSSIDs belong to a same wireless network device, and the mask may be set by a user according to a need. One unauthorized wireless network device may have only one BSSID, and may also have at least two different BSSIDs, where different BSSIDs of a same wireless network device have a relationship of mask. In the solution, to obtain all BSSIDs belonging to a same unauthorized wireless network device, the user generally set one mask to detect the unauthorized wireless network device determined in 102. The network management system converts both the BSSIDs of the unauthorized wireless network devices determined in 102 and the acquired mask into binary strings, and performs an AND operation on the two binary strings to obtain processing results.

106: Determine that BSSIDs, corresponding to the processing results being partially the same, of the unauthorized wireless network device are BSSIDs belonging to one unauthorized wireless network device.

The network management system may determine different BSSIDs of the same unauthorized wireless network device by performing the AND operation on the BSSIDs of the unauthorized wireless network device and the mask. The processing results corresponding to the different BSSIDs of the same unauthorized wireless network device are partially the same. The processing results being partially the same refer to processing results in which values of the last N binary digits are different and values of the other binary digits are the same. A specific value of N may be set by the user according to a need and accuracy, and generally the value of N falls within a range of 0-8. For example, N is preset to 8, that is, BSSIDs corresponding to processing results, in which values of the last 8 binary digits are different and values of the other binary digits are the same, are BSSIDs of a same unauthorized wireless network device. The AND operation is performed on BSSIDs of 00:04:03:02:01:00-00:04:03:02:01:1e and a mask of FF:FF:FF:FF:FF:00. Because the BSSIDs herein are represented in hexadecimal, the BSSIDs of 00:04:03:02:01:00-00:04:03:02:01:1e are different in the last 2 digits, and after the BSSIDs are converted into binary numbers, the BSSIDs are different in the last 8 digits. The AND operation is performed separately on the BSSIDs of 00:04:03:02:01:00-00:04:03:02:01:1e and the mask, and multiple BSSIDs corresponding to obtained processing results, in which values of the last 8 binary digits are different and values of the other the binary digits are the same, are BSSIDs of a same unauthorized wireless network, that is, the BSSIDs, with the masks being 00:04:03:02:01:00-00:04:03:02:01:1e, are BSSIDs belonging to a same unauthorized wireless network device.

107: Detect whether the number of all BSSIDs belonging to the unauthorized wireless network device is greater than or equal to 2.

One wireless network device may provide multiple sets of basic services, so that the wireless network device needs to be divided into multiple virtual network devices. For example, in a network with multiple sets of basic services, one set of basic services is for customer access, and another set of basic services is for internal use within an enterprise. Therefore, an AP needs to be divided into multiple VAPs, where each VAP also has a BSSID. Therefore, a same wireless network device may have multiple different BSSIDs; similarly, one unauthorized wireless network device may also have multiple different BSSIDs, and on this basis, whether one unauthorized wireless network device has 2 or more than 2 BSSIDs is detected.

108: If the number is greater than or equal to 2, maintain one BSSID of the unauthorized wireless network device.

For example, in the example of 105, BSSIDs of 00:04:03:02:01:00-00:04:03:02:01:1e belong to a same unauthorized wireless network device, and only one BSSID among 00:04:03:02:01:00-00:04:03:02:01:1e needs to be maintained. According to the maintained BSSID and a MAC forwarding table of a port used by a user, an unauthorized wireless network device corresponding to the BSSID may be determined.

If the number of BSSIDs belonging to one unauthorized wireless network device is less than 2, that is, the number of all BSSIDs belonging to one unauthorized wireless network device is 1, the BSSID of the unauthorized wireless network device is maintained, and the unauthorized wireless network device connected to the network port is determined by using the BSSID and the MAC forwarding table.

1044: Disable the network port to which the unauthorized wireless network device is connected.

The network management system may disable a service of the network port to which the unauthorized wireless network device is connected. For example, it is determined that an unauthorized wireless network device is connected to a network port A, the network management system performs a shutdown operation on the network port A to prevent the unauthorized wireless network device from being connected to the network, and may also send an alarm to notify a network manager.

When an unauthorized wireless network device, such as a notebook computer or a wireless network interface card, is connected to the network as a network hotspot, the network management system may determine, by using a WLAN API (Application Programming Interface), whether client software of the unauthorized wireless network device, such as the notebook computer or the wireless network interface card, enables the network hotspot. If the network hotspot is enabled and connected to the network, the client unauthorized wireless network device, such as the notebook computer or the wireless network interface card, may be directly forbidden from being connected to the network.

Figure 3B:
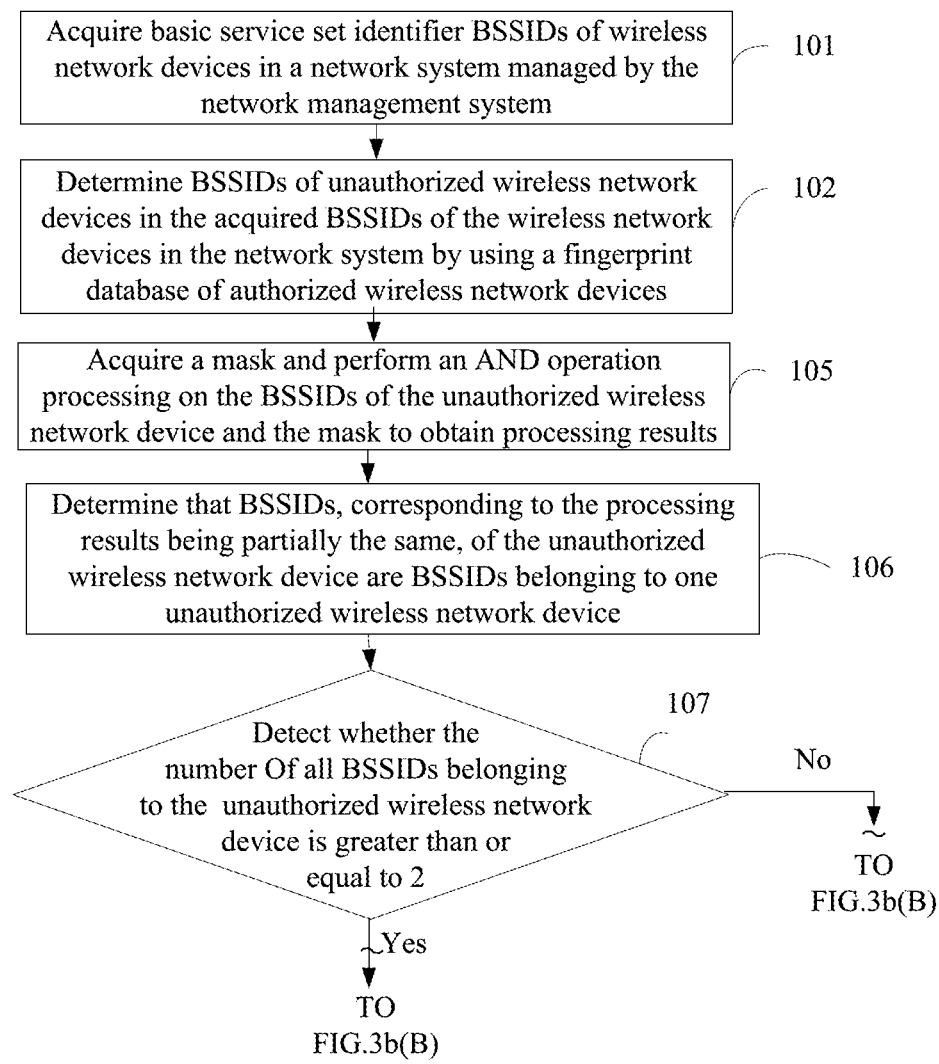
Figure 3B:
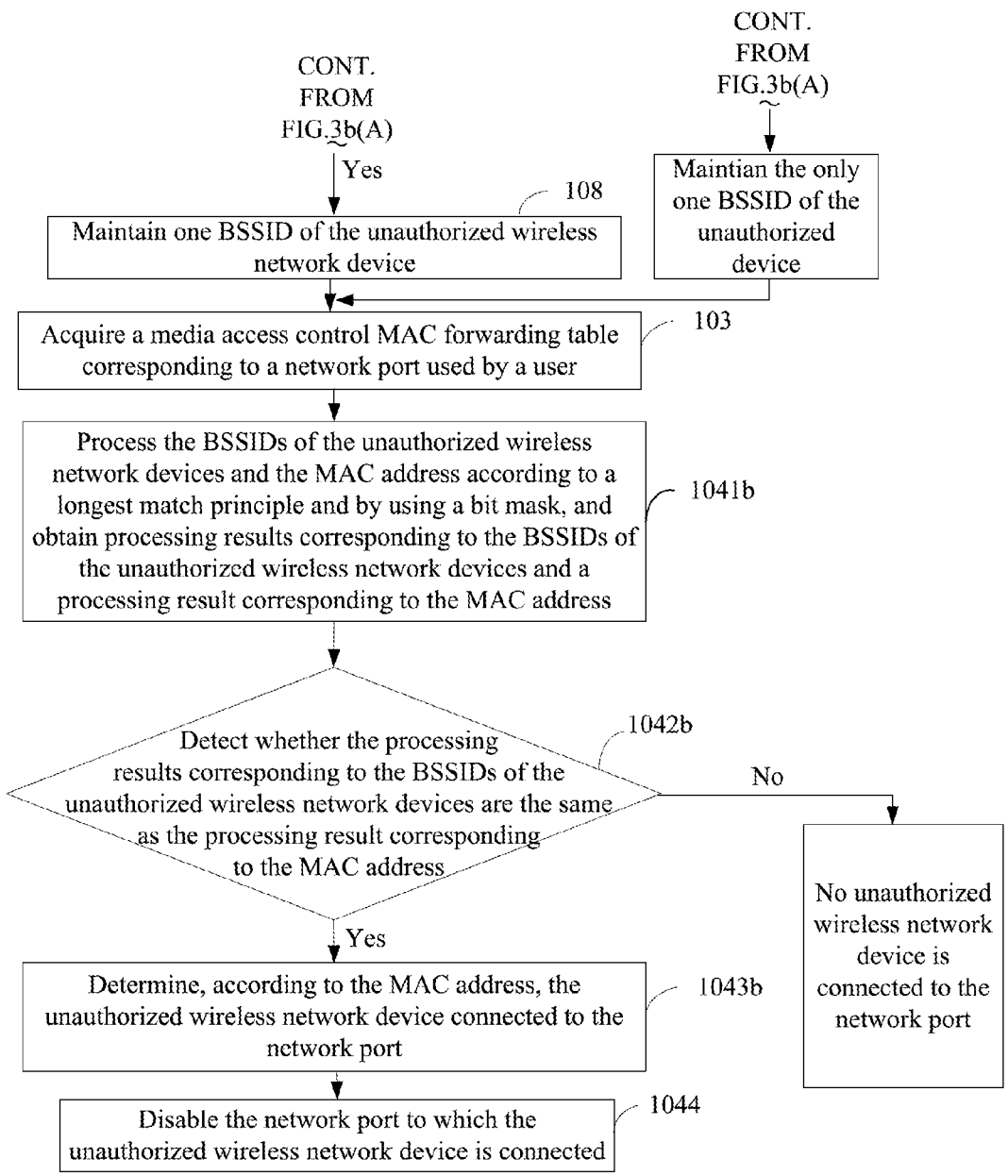
Figure 3C:
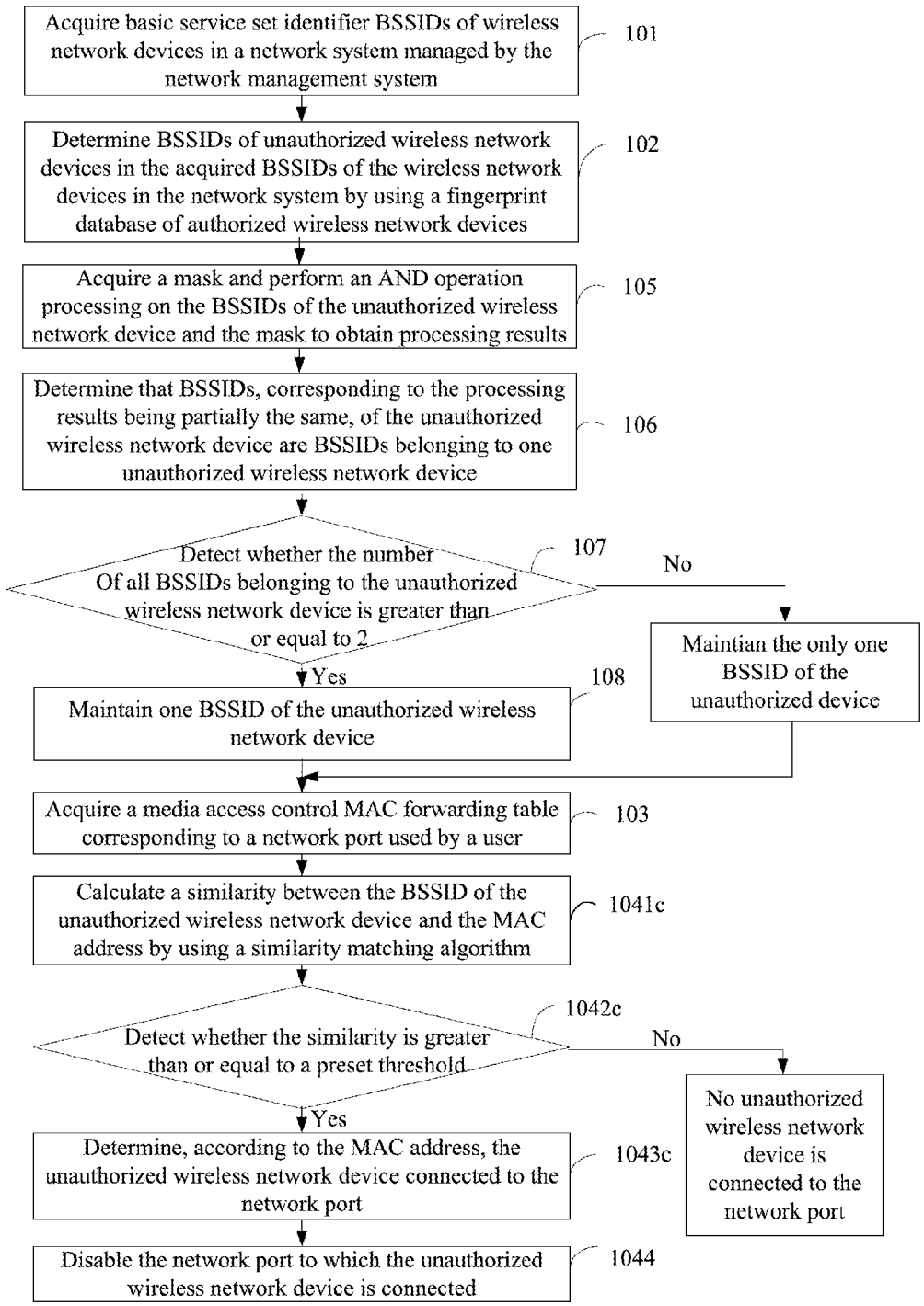

Optionally, with reference to the solutions of FIG. 3a and FIG. 2b, a solution shown in FIG. 3b(A) and FIG. 3b(B) may further be obtained; and with reference to the solutions of FIG. 3a and FIG. 2c, a solution shown in FIG. 3c may further be obtained.

According to the method for monitoring a network device provided in this embodiment of the present invention, BSSIDs of wireless network devices in a network system managed by a network management system can be acquired; BSSIDs of unauthorized wireless network devices are determined in the acquired BSSIDs of the wireless network devices in the network system by using a fingerprint database of authorized wireless network devices; all BSSIDs belonging to one unauthorized wireless network device are determined by using the BSSIDs of the unauthorized wireless network devices and a mask; whether the number of all the BSSIDs belonging to the unauthorized wireless network devices is greater than or equal to 2 is determined, and one BSSID of the unauthorized wireless network device is maintained when the number is greater than or equal to 2; a media access control MAC forwarding table corresponding to a network port used by a user is acquired; the unauthorized wireless network device connected to the network port is determined by using different methods and according to different types of wireless network devices; and the network port to which the unauthorized wireless network device is connected is disabled. Compared with the prior art, the solution determines, without depending on a specific number of MAC addresses in the MAC forwarding table, whether there is an unauthorized device connected to a network. Instead, the unauthorized wireless network device connected to the network port is accurately determined according to the BSSIDs of the unauthorized wireless network devices and the MAC forwarding table corresponding to the network port. Even in a case in which only one device is connected to the network port, whether the device is an unauthorized wireless network device can also be determined, thereby improving security of internal network information; and in a case in which multiple devices are connected to the network port, whether the devices are unauthorized wireless network devices can also be accurately determined. In addition, the network management system regularly acquires the MAC forwarding table, so that when a network device is newly added to the network, a relationship between a network port and a MAC address can be directly acquired, and binding each network port and a corresponding MAC address is no longer required, which leads to greater flexibility in management of the network port and searching for the MAC address. Further, because a BSSID of a network device to be detected may be a BSSID that is mistakenly reported as the BSSID of the unauthorized wireless network device, the BSSID of the unauthorized wireless network device is accurately obtained by using the fingerprint database of the authorized wireless network devices, thereby further improving a correctness percentage of determining the unauthorized wireless network device. In addition, for an unauthorized wireless network device having multiple BSSIDs, only one BSSID of the unauthorized wireless network device is maintained, which reduces the number of the BSSIDs of the unauthorized wireless network device, thereby saving time consumed in the subsequent detection and matching process. In addition, the network port to which the unauthorized wireless network device is connected is disabled, and consequently the unauthorized wireless network device cannot be connected to the network, thereby mitigating a threat to network information security in a timely manner.

Figure 4:
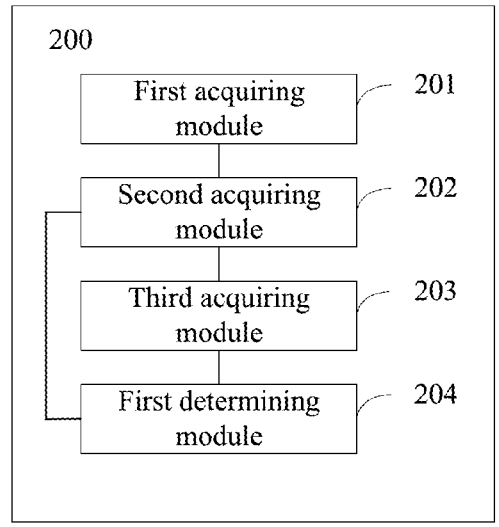
FIG. 4 is a schematic structural diagram of an apparatus for monitoring a network device according to an embodiment of the present invention.

An embodiment of the present invention further provides an apparatus 200 for monitoring a network device. As shown in FIG. 4, the apparatus 200 includes the following steps.

A first acquiring module 201, configured to acquire basic service set identifier BSSIDs of wireless network devices in a network system managed by the network management system.

A second acquiring module 202 is configured to determine BSSIDs of unauthorized wireless network devices in the acquired BSSIDs of the wireless network devices in the network system by using a fingerprint database of authorized wireless network devices, where the fingerprint database of the authorized wireless network devices includes all BSSIDs of the authorized wireless network devices, and the fingerprint database of the authorized wireless network devices does not include the BSSIDs of the unauthorized wireless network devices.

A third acquiring module 203 is configured to acquire a media access control MAC forwarding table corresponding to a network port used by a user.

The MAC forwarding table includes a MAC address of a wireless network device connected to the network port; and A first determining module 204, configured to determine, according to the BSSIDs of the unauthorized wireless network devices and the MAC address, the unauthorized wireless network device connected to the network port.

According to the apparatus for monitoring a network device provided in this embodiment of the present invention, BSSIDs (Basic Service Set Identifier) of wireless network devices in a network system managed by a network management system can be acquired. BSSIDs of unauthorized wireless network devices are determined in the acquired BSSIDs of the wireless network devices in the network system by using a fingerprint database of authorized wireless network devices; a media access control MAC forwarding table corresponding to a network port used by a user is acquired; and the unauthorized wireless network device connected to the network port is determined according to the BSSIDs of the unauthorized wireless network devices and the MAC address. Compared with the prior art, the solution determines, without depending on a specific number of MAC addresses in the MAC forwarding table, whether there is an unauthorized device connected to a network. Instead, the unauthorized wireless network device connected to the network port is accurately determined according to the BSSIDs of the unauthorized wireless network devices and the MAC forwarding table corresponding to the network port. Even in a case in which only one device is connected to the network port, whether the device is an unauthorized wireless network device can also be determined, thereby improving security of internal network information; and in a case in which multiple devices are connected to the network port, whether the devices are unauthorized wireless network devices can also be accurately determined. In addition, the network management system regularly acquires the MAC forwarding table, so that when a network device is newly added to the network, a relationship between a network port and a MAC address can be directly acquired, and binding each network port and a corresponding MAC address is no longer required, which leads to greater flexibility in management of the network port and searching for the MAC address. In addition, to accurately obtain the BSSIDs of the unauthorized wireless network devices, a BSSID of an authorized wireless network device that may be mistakenly reported as an unauthorized wireless network device is filtered by using the fingerprint database of the authorized wireless network devices, thereby further improving a correctness percentage of determining the unauthorized wireless network device.

Further, the first determining module 204 is further configured to detect whether the MAC address is the same as the BSSIDs of the unauthorized wireless network devices.

In addition, the first determining module 204 is configured to, if yes, determine, according to the MAC address, the unauthorized wireless network device connected to the network port.

Optionally, the first determining module 204 is further configured to process the BSSIDs of the unauthorized wireless network devices and the MAC address according to a longest match principle and by using a bit mask, and obtain processing results corresponding to the BSSIDs of the unauthorized wireless network devices and a processing result corresponding to the MAC address.

In addition, the first determining module 204 is configured to detect whether the processing results corresponding to the BSSIDs of the unauthorized wireless network devices are the same as the processing result corresponding to the MAC address.

In addition, the first determining module 204 is configured to, if yes, determine, according to the MAC address, the unauthorized wireless network device connected to the network port.

Optionally, the first determining module 204 is further configured to calculate a similarity between the BSSID of the unauthorized wireless network device and the MAC address by using a similarity matching algorithm.

In addition, the first determining module 204 is configured to detect whether the similarity is greater than or equal to a preset threshold.

In addition, the first determining module 204 is configured to determine, according to the MAC address, the unauthorized wireless network device connected to the network port when the similarity is greater than or equal to the preset threshold.

According to the apparatus for monitoring a network device provided in this embodiment of the present invention, BSSIDs of wireless network devices in a network system managed by a network management system can be acquired; BSSIDs of unauthorized wireless network devices are determined in the acquired BSSIDs of the wireless network devices in the network system by using a fingerprint database of authorized wireless network devices; a media access control MAC forwarding table corresponding to a network port used by a user is acquired; and the unauthorized wireless network device connected to the network port is determined by using different methods and according to different types of wireless network devices. Compared with the prior art, the solution determines, without depending on a specific number of MAC addresses in the MAC forwarding table, whether there is an unauthorized device connected to a network. Instead, the unauthorized wireless network device connected to the network port is accurately determined according to the BSSIDs of the unauthorized wireless network devices and the MAC forwarding table corresponding to the network port. Even in a case in which only one device is connected to the network port, whether the device is an unauthorized wireless network device can also be determined, thereby improving security of internal network information; and in a case in which multiple devices are connected to the network port, whether the devices are unauthorized wireless network devices can also be accurately determined. In addition, the network management system regularly acquires the MAC forwarding table, so that when a network device is newly added to the network, a relationship between a network port and a MAC address can be directly acquired, and binding each network port and a corresponding MAC address is no longer required, which leads to greater flexibility in management of the network port and searching for the MAC address. Further, because a BSSID of a network device to be detected may be a BSSID that is mistakenly reported as the BSSID of the unauthorized wireless network device, the BSSID of the unauthorized wireless network device is accurately obtained by using the fingerprint database of the authorized wireless network devices, thereby further improving a correctness percentage of determining the unauthorized wireless network device.

Figure 5:
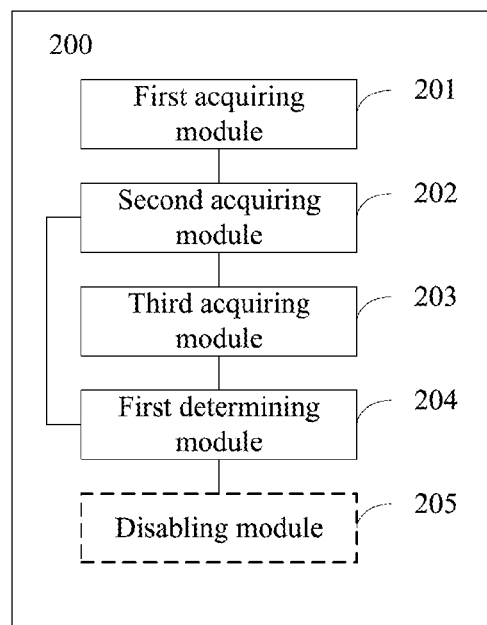
FIG. 5 is a schematic structural diagram of a specific implementation manner of an apparatus for monitoring a network device according to an embodiment of the present invention.

In addition, as shown in FIG. 5, the apparatus 200 further includes a disabling module 205 configured to disable the network port to which the unauthorized wireless network device is connected.

According to the method for monitoring a network device provided in this embodiment of the present invention, BSSIDs of wireless network devices in a network system managed by a network management system can be acquired; BSSIDs of unauthorized wireless network devices are determined in the acquired BSSIDs of the wireless network devices in the network system by using a fingerprint database of authorized wireless network devices; a media access control MAC forwarding table corresponding to a network port used by a user is acquired; and the unauthorized wireless network device connected to the network port is determined by using different methods and according to different types of wireless network devices; and the network port to which the unauthorized wireless network device is connected is disabled. Compared with the prior art, the solution determines, without depending on a specific number of MAC addresses in the MAC forwarding table, whether there is an unauthorized device connected to a network. Instead, the unauthorized wireless network device connected to the network port is accurately determined according to the BSSIDs of the unauthorized wireless network devices and the MAC forwarding table corresponding to the network port. Even in a case in which only one device is connected to the network port, whether the device is an unauthorized wireless network device can also be determined, thereby improving security of internal network information; and in a case in which multiple devices are connected to the network port, whether the devices are unauthorized wireless network devices can also be accurately determined. In addition, the network management system regularly acquires the MAC forwarding table, so that when a network device is newly added to the network, a relationship between a network port and a MAC address can be directly acquired, and binding each network port and a corresponding MAC address is no longer required, which leads to greater flexibility in management of the network port and searching for the MAC address. Further, because a BSSID of a network device to be detected may be a BSSID that is mistakenly reported as the BSSID of the unauthorized wireless network device, the BSSID of the unauthorized wireless network device is accurately obtained by using the fingerprint database of the authorized wireless network devices, thereby further improving a correctness percentage of determining the unauthorized wireless network device. In addition, the network port to which the unauthorized wireless network device is connected is disabled, and consequently the unauthorized wireless network device cannot be connected to the network, thereby mitigating a threat to network information security in a timely manner.

Figure 6:
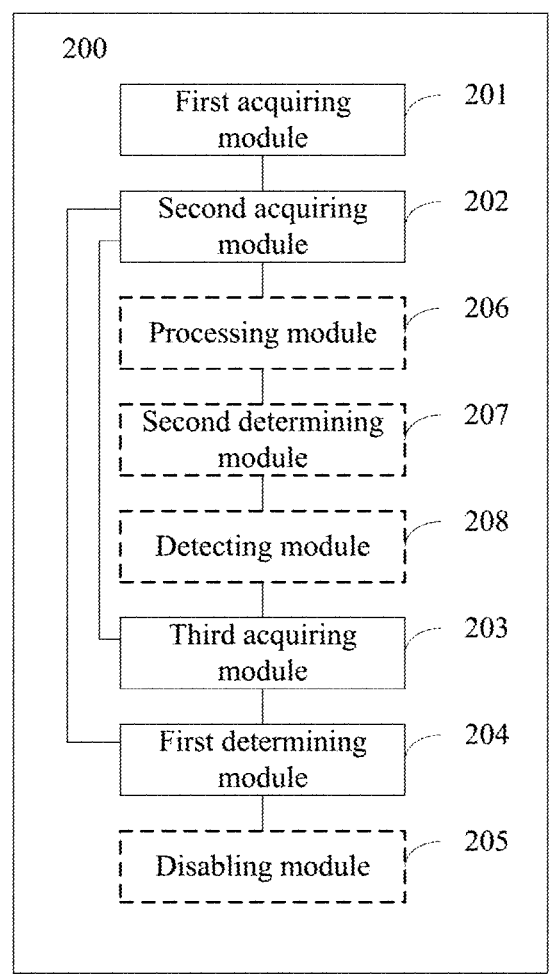
FIG. 6 is a schematic structural diagram of another specific implementation manner of an apparatus for monitoring a network device according to an embodiment of the present invention.

In addition, as shown in FIG. 6, the apparatus 200 further includes a processing module 206 configured to acquire a mask and perform an AND operation processing on the BSSIDs of the unauthorized wireless network device and the mask to obtain processing results. A second determining module 207 is configured to determine that BSSIDs, corresponding to the processing results being partially the same, of the unauthorized wireless network device are BSSIDs belonging to one unauthorized wireless network device. A detecting module 208 is configured to detect whether the number of all BSSIDs belonging to the unauthorized wireless network device is greater than or equal to 2; and when the number is greater than or equal to 2, maintain one BSSID of the unauthorized wireless network device.

According to the apparatus for monitoring a network device provided in this embodiment of the present invention, BSSIDs of wireless network devices in a network system managed by a network management system can be acquired; BSSIDs of unauthorized wireless network devices are determined in the acquired BSSIDs of the wireless network devices in the network system by using a fingerprint database of authorized wireless network devices; all BSSIDs belonging to one unauthorized wireless network device are determined by using the BSSIDs of the unauthorized wireless network devices and a mask; whether the number of all the BSSIDs belonging to the unauthorized wireless network devices is greater than or equal to 2 is determined, and one BSSID of the unauthorized wireless network device is maintained when the number is greater than or equal to 2; a media access control MAC forwarding table corresponding to a network port used by a user is acquired; the unauthorized wireless network device connected to the network port is determined by using different methods and according to different types of wireless network devices; and the network port to which the unauthorized wireless network device is connected is disabled. Compared with the prior art, the solution determines, without depending on a specific number of MAC addresses in the MAC forwarding table, whether there is an unauthorized device connected to a network. Instead, the unauthorized wireless network device connected to the network port is accurately determined according to the BSSIDs of the unauthorized wireless network devices and the MAC forwarding table corresponding to the network port. Even in a case in which only one device is connected to the network port, whether the device is an unauthorized wireless network device can also be determined, thereby improving security of internal network information; and in a case in which multiple devices are connected to the network port, whether the devices are unauthorized wireless network devices can also be accurately determined. In addition, the network management system regularly acquires the MAC forwarding table, so that when a network device is newly added to the network, a relationship between a network port and a MAC address can be directly acquired, and binding each network port and a corresponding MAC address is no longer required, which leads to greater flexibility in management of the network port and searching for the MAC address. Further, because a BSSID of a network device to be detected may be a BSSID that is mistakenly reported as the BSSID of the unauthorized wireless network device, the BSSID of the unauthorized wireless network device is accurately obtained by using the fingerprint database of the authorized wireless network devices, thereby further improving a correctness percentage of determining the unauthorized wireless network device. In addition, for an unauthorized wireless network device having multiple BSSIDs, only one BSSID of the unauthorized wireless network device is maintained, which reduces the number of the BSSIDs of the unauthorized wireless network device, thereby saving time consumed in the subsequent detection and matching process. In addition, the network port to which the unauthorized wireless network device is connected is disabled, and consequently the unauthorized wireless network device cannot be connected to the network, thereby mitigating a threat to network information security in a timely manner.

Figure 7:
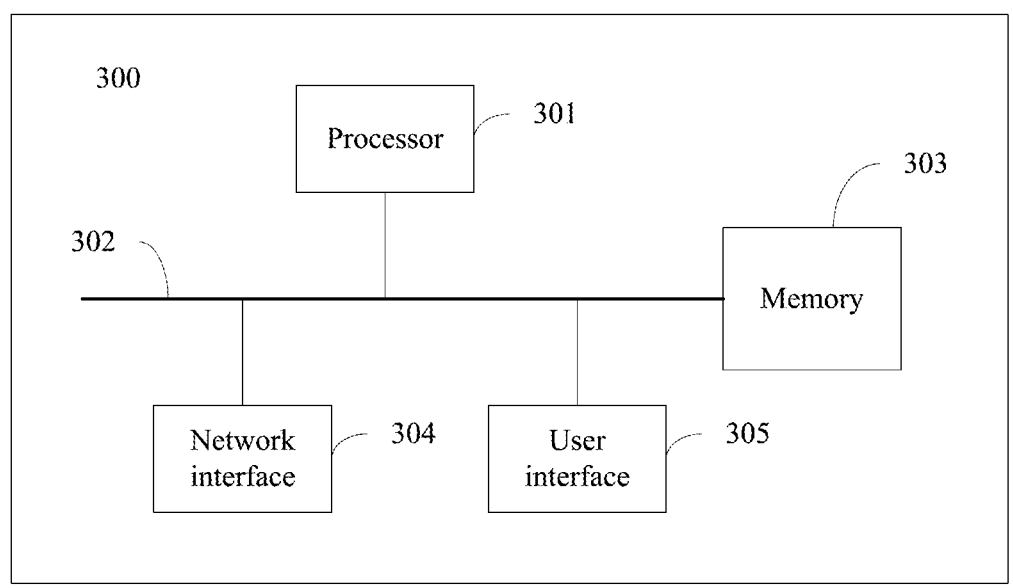
FIG. 7 is a schematic structural diagram of a network management system according to an embodiment of the present invention.

An embodiment of the present invention further provides a network management system 300. As shown in FIG. 7, the network management system 300 includes: at least one processor 301, at least one communications bus 302, a memory 303, at least one network interface 304 and/or at least one user interface 305. The communications bus 302 is configured to implement connection and communication among these components. Optionally, the user interface 305 is configured to connect to a device such as a display, a keyboard, a mouse, and a touchscreen. The memory 303 may include a high speed RAM (random access memory, random access memory) memory, and may also include a non-volatile memory (non-volatile memory), for example, at least one magnetic disk storage.

Specifically, the memory 303 is configured to store a computer program. The memory 303 may further be configured to store BSSIDs of wireless network devices in a network system, may further be configured to store a fingerprint database of authorized wireless network devices, where the fingerprint database of the authorized wireless network devices includes all BSSIDs of the authorized wireless network devices, may further be configured to store BSSIDs of unauthorized wireless network devices, and may further be configured to store a MAC forwarding table corresponding to a network port used by a user.

Specifically, the processor 301 is configured to read the computer program in the memory 303, and execute the following operations. The basic service set identifier BSSIDs of the wireless network devices in the network system managed by the network management system is acquired. The BSSIDs of the unauthorized wireless network devices in the acquired BSSIDs of the wireless network devices in the network system is determined by using the fingerprint database of the authorized wireless network devices. The fingerprint database of the authorized wireless network devices includes the BSSIDs of all the authorized wireless network devices, and the fingerprint database of the authorized wireless network devices does not include the BSSIDs of the unauthorized wireless network devices. The method further includes acquiring the media access control MAC forwarding table corresponding to the network port used by a user. The MAC forwarding table includes a MAC address of the wireless network device connected to the network port; and determining the unauthorized wireless network device connected to the network port according to the BSSIDs of the unauthorized wireless network devices and the MAC address.

Further, the processor 301 is further configured to detect whether the MAC address is the same as the BSSIDs of the unauthorized wireless network devices; and configured to, if yes, determine the unauthorized wireless network device connected to the network port according to the MAC address.

Optionally, the processor 301 is further configured to process the BSSIDs of the unauthorized wireless network devices and the MAC address according to a longest match principle and by using a bit mask, and obtain processing results corresponding to the BSSIDs of the unauthorized wireless network devices and a processing result corresponding to the MAC address; configured to detect whether the processing results corresponding to the BSSIDs of the unauthorized wireless network devices are the same as the processing result corresponding to the MAC address; and configured to, if yes, determine, according to the MAC address, the unauthorized wireless network device connected to the network port.

Optionally, the processor 301 is further configured to calculate a similarity between the BSSID of the unauthorized wireless network device and the MAC address by using a similarity matching algorithm; configured to detect whether the similarity is greater than or equal to a preset threshold; and configured to determine, according to the MAC address, the unauthorized wireless network device connected to the network port when the similarity is greater than or equal to the preset threshold.

In addition, the processor 301 is further configured to disable the network port to which the unauthorized wireless network device is connected.

In addition, the processor 301 is further configured to acquire a mask and perform an AND operation processing on the BSSIDs of the unauthorized wireless network device and the mask to obtain processing results; configured to determine that the BSSIDs, corresponding to the processing results being partially the same, of the unauthorized wireless network device are BSSIDs belonging to one unauthorized wireless network device; and configured to detect whether the number of all the BSSIDs belonging to one unauthorized wireless network device is greater than or equal to 2, and when the number is greater than or equal to 2, maintain one BSSID of the unauthorized wireless network device.

It should be noted that, after acquiring data, such as the BSSID, the processor 301 may store the acquired data in the memory 303, or an intermediate result generated by the processor 301 in a process of executing an operation may also be stored into the memory 303, which are technologies known in the art, and are not described in detail in this embodiment of the present invention.

According to the network management system provided in this embodiment of the present invention, BSSIDs of wireless network devices in a network system managed by a network management system can be acquired; BSSIDs of unauthorized wireless network devices are determined in the acquired BSSIDs of the wireless network devices in the network system by using a fingerprint database of authorized wireless network devices; all BSSIDs belonging to one unauthorized wireless network device are determined by using the BSSID of the unauthorized wireless network device and a mask; whether the number of all the BSSIDs belonging to the unauthorized wireless network device is greater than or equal to 2 is determined, and one BSSID of the unauthorized wireless network device is maintained when the number is greater than or equal to 2; a media access control MAC forwarding table corresponding to a network port used by a user is acquired; the unauthorized wireless network device connected to the network port can be determined by using different methods and according to different types of wireless network devices; and the network port to which the unauthorized wireless network device is connected is disabled. Compared with the prior art, the solution determines, without depending on a specific number of MAC addresses in the MAC forwarding table, whether there is an unauthorized device connected to a network. Instead, the unauthorized wireless network device connected to the network port is accurately determined according to the BSSID of the unauthorized wireless network device and the MAC forwarding table corresponding to the network port. Even in a case in which only one device is connected to the network port, whether the device is an unauthorized wireless network device can also be determined, thereby improving security of internal network information; and in a case in which multiple devices are connected to the network port, whether the devices are unauthorized wireless network devices can also be accurately determined. In addition, the network management system regularly acquires the MAC forwarding table, so that when a network device is newly added to the network, a relationship between a network port and a MAC address can be directly acquired, and binding each network port and a corresponding MAC address is no longer required, which leads to greater flexibility in management of the network port and searching for the MAC address. Further, because a BSSID of a network device to be detected may be a BSSID that is mistakenly reported as the BSSID of the unauthorized wireless network device, the BSSID of the unauthorized wireless network device is accurately obtained by using the fingerprint database of the authorized wireless network devices, thereby further improving a correctness percentage of determining the unauthorized wireless network device. In addition, the network port to which the unauthorized wireless network device is connected is disabled, and consequently the unauthorized wireless network device cannot be connected to the network, thereby mitigating a threat to network information security in a timely manner.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include a disk, an optical disc, a read-only memory (ROM), or a random access memory (RAM), and the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for monitoring a network device, wherein the method is applied to a network management system, and the method comprises:
   acquiring basic service set identifiers (BSSIDs) of wireless network devices in a network system managed by the network management system;
   determining BSSIDs of unauthorized wireless network devices in the acquired BSSIDs of the wireless network devices in the network system by using a fingerprint database of authorized wireless network devices, wherein the fingerprint database of the authorized wireless network devices comprises BSSIDs of all the authorized wireless network devices, and the fingerprint database of the authorized wireless network devices does not comprise any BSSIDs of the unauthorized wireless network devices, wherein after the determining the BSSIDs of the unauthorized wireless network devices,
      acquiring a mask and performing an AND operation processing on each of the determined BSSIDs of the unauthorized wireless network device and the mask to obtain processing results,
      determining that the processing results are the same and belong to one unauthorized wireless network device, and
      detecting whether the number of all the BSSIDs corresponding to the processing results and determined to belong to the unauthorized wireless network device is greater than or equal to 2; and in response to the detecting that the number is greater than or equal to 2, maintaining a single BSSID of the unauthorized wireless network device from the determined BSSIDs of the unauthorized wireless network device;
   acquiring a media access control (MAC) forwarding table corresponding to a network port used by a user, wherein the MAC forwarding table comprises a MAC address of a wireless network device connected to the network port; and
   determining, according to the single BSSID of the unauthorized wireless network devices and the MAC address, an unauthorized wireless network device connected to the network port.

2. The method for monitoring a network device according to claim 1, wherein the determining, according to the BSSIDs of the unauthorized wireless network devices and the MAC address, an unauthorized wireless network device connected to the network port comprises:
   detecting whether the MAC address is the same as the BSSIDs of the unauthorized wireless network devices; and
   in response to the detecting that the MAC address is the same as a BSSID of the unauthorized wireless network device, determining, according to the MAC address, the unauthorized wireless network device connected to the network port.

3. The method for monitoring a network device according to claim 1, wherein the determining, according to the BSSIDs of the unauthorized wireless network devices and the MAC address, an unauthorized wireless network device connected to the network port comprises:
   processing the BSSIDs of the unauthorized wireless network devices and the MAC address according to a longest match principle and by using a bit mask, and obtaining processing results corresponding to the BSSIDs of the unauthorized wireless network devices and a processing result corresponding to the MAC address;
   detecting whether the processing results corresponding to the BSSIDs of the unauthorized wireless network devices are the same as the processing result corresponding to the MAC address; and
   in response to the detecting that a processing result corresponding to a BSSID of the unauthorized wireless network device is the same as the processing result corresponding to the MAC address, determining, according to the MAC address, the unauthorized wireless network device connected to the network port.

4. The method for monitoring a network device according to claim 1, wherein the determining, according to the BSSIDs of the unauthorized wireless network devices and the MAC address, an unauthorized wireless network device connected to the network port comprises:
   calculating a similarity between a BSSID of the unauthorized wireless network device and the MAC address by using a similarity matching algorithm;
   detecting whether the similarity is greater than or equal to a preset threshold; and
   determining, according to the MAC address, the unauthorized wireless network device connected to the network port if the similarity is greater than or equal to the preset threshold.

5. The method for monitoring a network device according to claim 2, after the determining the unauthorized wireless network device connected to the network port, comprising:
   disabling the network port to which the unauthorized wireless network device is connected.

6. An apparatus for monitoring a network device, wherein the apparatus is applied to a network management system, and the apparatus comprises:

a processor;
a memory storing a program to be executed in the processor, the program comprising a plurality of modules, the plurality of modules comprising:
  a first acquiring module, configured to acquire basic service set identifiers (BSSIDs) of wireless network devices in a network system managed by the network management system;
  a second acquiring module, configured to determine BSSIDs of unauthorized wireless network devices in the acquired BSSIDs of the wireless network devices in the network system by using a fingerprint database of authorized wireless network devices, wherein the fingerprint database of the authorized wireless network devices comprises BSSIDs of all the authorized wireless network devices, and the fingerprint database of the authorized wireless network devices does not comprise any BSSIDs of the unauthorized wireless network devices;
  a processing module configured to acquire a mask and perform an AND operation processing on each of the determined BSSIDs of the unauthorized wireless network device and the mask to obtain processing results;
  a second determining module configured to determine that the processing results are the same and belong to one unauthorized wireless network device;
  a detecting module configured to detect whether the number of all the BSSIDs corresponding to the processing results and determined to belong to the unauthorized wireless network device is greater than or equal to 2; and in response to the detecting that the number is greater than or equal to 2, maintain a single BSSID of the unauthorized wireless network device from the determined BSSIDs of the unauthorized wireless network device;
  a third acquiring module, configured to acquire a media access control (MAC) forwarding table corresponding to a network port used by a user, wherein the MAC forwarding table comprises a MAC address of a wireless network device connected to the network port; and
  a first determining module, configured to determine, according to the single BSSID of the unauthorized wireless network devices and the MAC address, an unauthorized wireless network device connected to the network port.

7. The apparatus for monitoring a network device according to claim 6, wherein the first determining module is further configured to detect whether the MAC address is the same as the BSSIDs of the unauthorized wireless network devices; and
  configured to, if the MAC address is the same as a BSSID of the unauthorized wireless network device, determine, according to the MAC address, the unauthorized wireless network device connected to the network port.

8. The apparatus for monitoring a network device according to claim 6, wherein the first determining module is further configured to process the BSSIDs of the unauthorized wireless network devices and the MAC address according to a longest match principle and by using a bit mask, and obtain processing results corresponding to the BSSIDs of the unauthorized wireless network devices and a processing result corresponding to the MAC address;
  configured to detect whether the processing results corresponding to the BSSIDs of the unauthorized wireless network devices are the same as the processing result corresponding to the MAC address; and
  configured to, if a processing result corresponding to a BSSID of the unauthorized wireless network device is the same as the processing result corresponding to the MAC address, determine, according to the MAC address, the unauthorized wireless network device connected to the network port.

9. The apparatus for monitoring a network device according to claim 6, wherein the first determining module is further configured to calculate a similarity between a BSSID of the unauthorized wireless network device and the MAC address by using a similarity matching algorithm;
  configured to detect whether the similarity is greater than or equal to a preset threshold; and
  configured to determine, according to the MAC address, the unauthorized wireless network device connected to the network port when the similarity is greater than or equal to the preset threshold.

10. The apparatus for monitoring a network device according to claim 7, wherein the plurality of modules further comprises:
  a disabling module, configured to disable the network port to which the unauthorized wireless network device is connected.

* * * * *